(12) United States Patent
Manavi Tehrani et al.

(10) Patent No.: US 12,339,895 B2
(45) Date of Patent: Jun. 24, 2025

(54) EXTRACTING INFORMATION FROM UNSTRUCTURED SERVICE AND ORGANIZATIONAL CONTROL AUDIT REPORTS USING NATURAL LANGUAGE PROCESSING AND COMPUTER VISION

(71) Applicant: International Business Machines Corporation, Armonk, NY (US)

(72) Inventors: Behnam Manavi Tehrani, Bethesda, MD (US); Dennis Richard Embrey, Front Royal, VA (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 18/049,722

(22) Filed: Oct. 26, 2022

(65) Prior Publication Data

US 2024/0143646 A1 May 2, 2024

(51) Int. Cl.
*G06F 16/00* (2019.01)
*G06F 16/48* (2019.01)
*G06F 16/903* (2019.01)

(52) U.S. Cl.
CPC ........ *G06F 16/48* (2019.01); *G06F 16/90335* (2019.01)

(58) Field of Classification Search
CPC ............................ G06F 16/48; G06F 16/90335
See application file for complete search history.

(56) References Cited

U.S. PATENT DOCUMENTS

| 8,140,468 | B2 | 3/2012 | Kwok et al. |
| 10,127,562 | B2 | 11/2018 | Price et al. |

(Continued)

FOREIGN PATENT DOCUMENTS

| EP | 3404542 A1 | 11/2018 |
| WO | 2019160557 A1 | 8/2019 |

OTHER PUBLICATIONS

KPMG. "Intelligent automation and internal audit: Adding value through governance, risk management, and controls." https://assets.kpmg/content/dam/kpmg/ch/pdf/intelligent-automation-and-internal audit.pdf (2018). 12 pages.

Staar et al. "Corpus Conversion Service: A Machine Learning Platform to Ingest Documents at Scale." arXiv preprint arXiv:1806.02284 (2018). 9 pages.

*Primary Examiner* — Paul Kim
(74) *Attorney, Agent, or Firm* — CANTOR COLBURN LLP; Robert Bean

(57) ABSTRACT

Embodiments of the invention provide a computer-implemented method that includes accessing an electronic audit report that includes audit information of operations of an entity-under-evaluation (EUA) covering a first time-range, wherein the audit information of the electronic audit report includes multiple electronic format types. A normalized electronic audit report is created by converting the audit information of the electronic audit report from the multiple electronic format types to a normalized electronic format. The normalized electronic audit report is stored in a searchable repository that includes a plurality of normalized electronic audit reports of the EUA covering a plurality of time-ranges that are prior to the first time-range. The normalized electronic format is used to search the searchable repository to determine how stored audit information associated with the EUA and the normalized electronic format has changed over the plurality of time-ranges and the first time-range.

20 Claims, 8 Drawing Sheets

(56) References Cited

U.S. PATENT DOCUMENTS

| | | | |
|---|---|---|---|
| 10,846,341 B2 | 11/2020 | Cerino et al. | |
| 10,917,439 B2 | 2/2021 | Puratheppparambil et al. | |
| 11,055,415 B2 | 7/2021 | Sherman et al. | |
| 11,862,305 B1* | 1/2024 | Sethi | G06N 20/00 |
| 2014/0344005 A1* | 11/2014 | Jayade | G06F 16/93 |
| | | | 705/7.26 |
| 2015/0154193 A1 | 6/2015 | Dave et al. | |
| 2017/0277663 A1* | 9/2017 | Reimherr | G06F 3/0481 |
| 2018/0341830 A1 | 11/2018 | Jagan et al. | |
| 2019/0026661 A1 | 1/2019 | Cortell et al. | |
| 2019/0354509 A1 | 11/2019 | Ralhan | |
| 2019/0354583 A1 | 11/2019 | Ralhan | |
| 2020/0111023 A1 | 4/2020 | Pondicherry Murugappan et al. | |
| 2020/0302166 A1 | 9/2020 | Meier et al. | |
| 2024/0296188 A1* | 9/2024 | Smith | G06F 40/242 |

\* cited by examiner

EXTRACTING INFORMATION FROM UNSTRUCTURED SERVICE AND ORGANIZATIONAL CONTROL AUDIT REPORTS USING NATURAL LANGUAGE PROCESSING AND COMPUTER VISION

BACKGROUND

The present invention relates in general to programmable computers. More specifically, the present invention relates to computing systems, computer-implemented methods, and computer program products operable to automatically extract information from unstructured service and organizational control audit reports using natural language processing and computer vision.

A service and organizational control (SOC) audit report is a way to verify that an organization is following some specific best practices before a business function is outsourced to that organization. These business functions can include security, processing integrity, privacy, and availability. SOC audit reports provide independent assurance and to help potential customers/partners understand any potential risks involved in working with the organization that was evaluated.

In order to use electronic systems to store and analyze documents such as SOC audit reports, it is necessary to convert such documents to an electronic format. In general, electronic versions of SOC audit reports are unstructured or semi-structured. Electronic information can be categorized as unstructured, semi-structured, or structured. Unstructured electronic information is not organized in a uniform format (i.e., it is not labeled or otherwise organized) and can include text, images, video, and audio material. Similarly, semi-structured electronic information includes some form of organization (e.g., some semantic labels/tags) but the chosen organization method lacks consistency, is not standardized, or has some other deficiency. In contrast, structured electronic information is information that has been well-organized and arranged in a systematic, easily accessible way, including, for example, attaching consistent labels to the electronic information and/or organizing the electronic information into an addressable repository or a database.

SUMMARY

Embodiments of the invention are directed to a computer-implemented method. A non-limiting example of the computer-implemented method includes accessing an electronic audit report that includes audit information of operations of an entity-under-evaluation (EUA) covering a first time-range, wherein the audit information of the electronic audit report includes multiple electronic format types. A normalized electronic audit report is created by converting the audit information of the electronic audit report from the multiple electronic format types to a normalized electronic format. The normalized electronic audit report is stored in a searchable repository that includes a plurality of normalized electronic audit reports of the EUA covering a plurality of time-ranges that are prior to the first time-range. The normalized electronic format is used to search the searchable repository to determine how stored audit information associated with the EUA and the normalized electronic format has changed over the plurality of time-ranges and the first time-range.

Embodiments of the invention are also directed to computer systems and computer program products having substantially the same features as the computer-implemented method described above.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
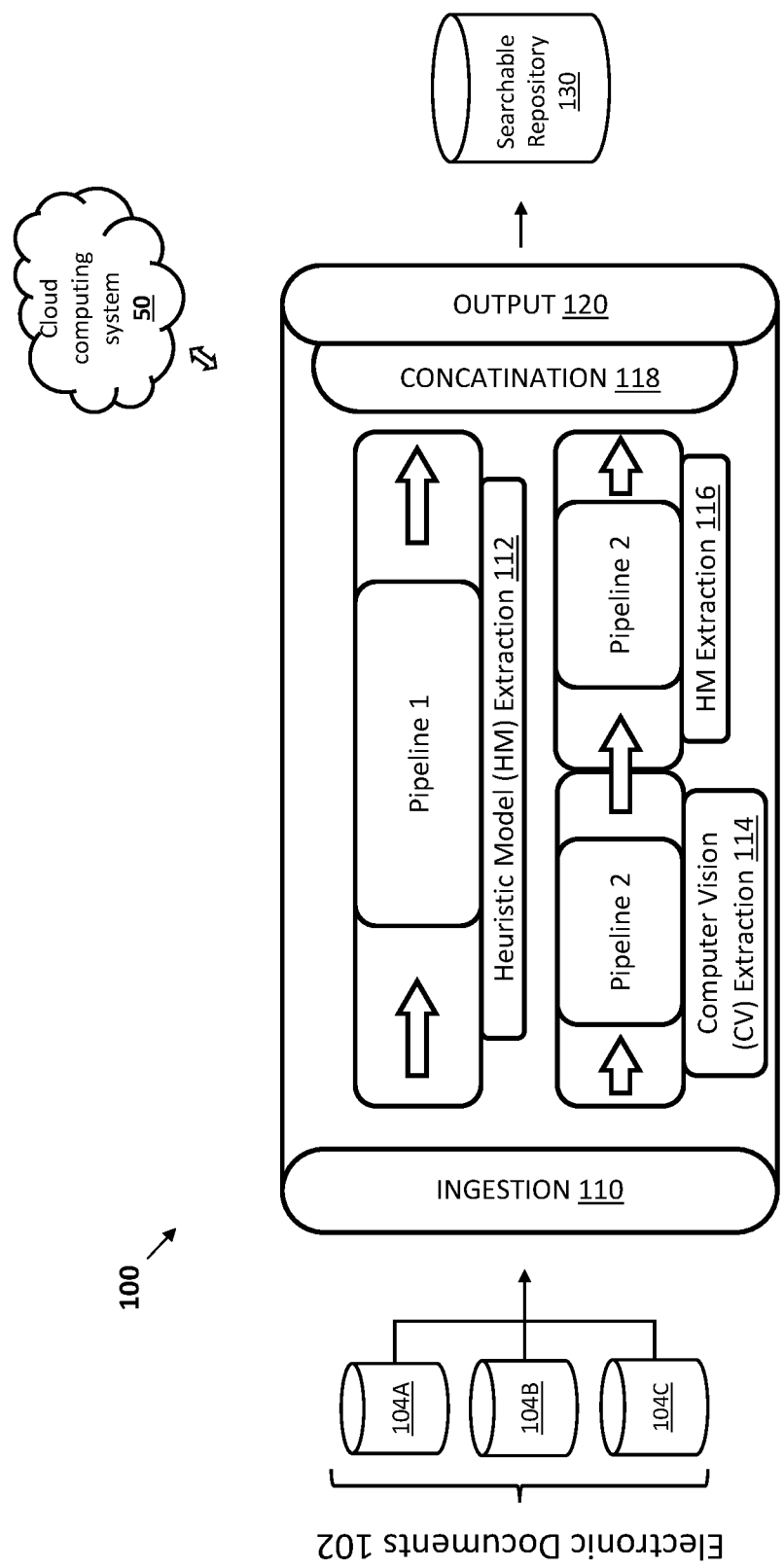
FIG. 1 depicts a simplified block diagram illustrating a system in accordance with embodiments of the invention.

In the accompanying figures and following detailed description of the disclosed embodiments, the various elements illustrated in the figures are provided with three-digit reference numbers. In some instances, the leftmost digits of each reference number correspond to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units of the systems described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, function as the module and achieve the stated purpose for the module.

Many of the functional units of the systems described in this specification have been labeled as models. Embodiments of the invention apply to a wide variety of model implementations. For example, the models described herein can be implemented as machine learning algorithms and natural language processing algorithms configured and arranged to uncover unknown relationships between data/information and generate a model that applies the uncovered relationship to new data/information in order to perform an assigned task of the model. In aspects of the invention, the models described herein can have all of the features and functionality of the models depicted in FIGS. 6 and 7, which are described in greater detail subsequently herein.

Turning now to an overview of technologies that are relevant to aspects of the invention, as previously noted herein, a service and organizational control (SOC) audit report is a way to verify that an organization is following some specific best practices before a business function is outsourced to that organization. These business functions can include security, processing integrity, privacy, and availability. SOC audit reports provide independent assurance and to help potential customers/partners understand any potential risks involved in working with the organization that was evaluated.

SOC reports provide thorough business overviews that canvas the organization's in-scope systems in a logical way. Whether entering a new partnership or reviewing current inventory of business relationships, SOC reports provide valuable information that will be relevant in many stages of the vendor lifecycle. These reports communicate the checks and balances a company is enforcing to root out inconsistencies and send a strong message to customers that attention is being paid to how policies and procedures are followed. No decision is ever completely risk-proof, but SOC reports provide context that can be useful in determining the amount of risk involved.

In SOC systems, the "service organization" is the organization being tested; the "user entity" is the organization looking to outsource a business function to (or otherwise partner with) the service organization. The term "control" generally refers to the auditable process or mechanism designed to prevent or detect unintended consequences (e.g., fraud, misreporting, etc.).

SOC reports are governed by the American Institute of Certified Public Accountants (AICPA) and focus on offering assurance that the controls service organizations put in place to protect their clients' assets (data in most cases) are effective. There are four main types: SOC 1, SOC 2, SOC 3, and SOC for Cybersecurity, with subsets of each. SOC1 reports focus on outsourced services performed by service organizations, which are relevant to a company's (user entity) financial reporting. An SOC2 report is also an attestation report issued by an independent Certified Public Accounting (CPA) firm. Its focus addresses operational risks of outsourcing to third-parties outside financial reporting. These reports are based on the Trust Services Criteria, which include up to five categories: security, availability, processing integrity, confidentiality, and/or privacy. The biggest difference between a SOC 1 vs. SOC 2 report is the focus of examination. An SOC3 report covers similar reporting areas as the SOC 2, but isn't as comprehensive. It excludes certain details of the description and all of the detailed controls/results of testing. Whereas an SOC2 report restricts users, the benefit of an SOC3 is that it is a general-use report making it a great tool for marketing purposes. SOC for Cybersecurity resulted from the American Institute of Certified Public Accountants (AICPA) responding to the increase in cybersecurity attacks by publishing the Cybersecurity Risk Management Reporting Framework, also known as the "System and Organization Controls (SOC) for Cybersecurity." In an SOC for Cybersecurity report, a CPA reports on an organization's enterprise-wide cybersecurity risk management program. SOC for Cybersecurity is ideal for businesses, non-profits, and virtually any other type of organization that wants to take a proactive approach to risk management. The type of assessment a business chooses will depend on its services and business model.

Natural language processing (NLP) is a field of computer science that uses algorithms and computer systems to process human languages such as English. Human language is often referred to as natural language. In general, the terms "natural language" refer to language that has been developed by humans over time as a method of communicating between people, rather than language that has been created for communication between non-human entities such as computers.

NLP is used in systems that allow humans to more effectively interface with data repositories that store electronic information, including, for example, electronic versions of human readable electronic documents. NLP interfaces/systems have been developed to perform a variety of human/data interface tasks such as text-searching and/or text-matching, as well as more sophisticated tasks such as document/data content analysis (DCA). In general, DCA systems conduct computer-assisted research and analysis using the categorization and classification of speech, written text, interviews, images, or other forms of electronically stored sources of information. A known type of DCA is so-called a "question and answer (QA) system" that use NLP and machine learning algorithms to cognitively analyze a variety of stored sources of information in order to provide answers to open-ended natural language questions.

In known implementations of DCA and/or QA systems, training data is used to train machine learning models (or classifiers) to perform the systems' overall task(s). This training stage requires that training data, as well as post-training real world data-under-analysis, is translated into numerical representations that can be recognized and manipulated by the DCA system's machine learning model. Examples of suitable numerical representations of the data include tokens, vectors, and the like. Translating training data and/or post-training real world data-under-analysis into such numerical representations can be a processing bottleneck in known DCA/QA systems. This is particularly true when the training data and/or post-training real world data-under-analysis are unstructured and/or semi-structured.

Electronic information can be categorized as unstructured, semi-structured, or structured. Unstructured electronic information is not organized in a uniform format (i.e., it is not labeled or otherwise organized) and can include text, images, video, and audio material. Similarly, semi-structured electronic information includes some form of organization (e.g., some semantic labels/tags) but the chosen organization method lacks consistency, is not standardized, or has some other deficiency. In contrast, structured electronic information is information that has been well-organized and arranged in a systematic, easily accessible way, including, for example, attaching consistent labels to the electronic information and/or organizing the electronic information into an addressable repository or a database.

Because virtually all of the electronic information generated in the day-to-day functions of businesses, academic institutions, non-business enterprises, and individuals is unstructured and/or semi-structured, a large amount of unstructured and/or semi-structured electronic information represents a large amount of information that is substantially unavailable as an information source to known DCA systems. In general, the results generated by DCA systems can be improved with access to a wider range and variety of electronic information. Accordingly, it would be beneficial to provide DCA systems that can electronically read and understand the vast amounts of unstructured and/or semi-structured electronic information efficiently, reliably, and without requiring large amounts of computing resources.

Turning now to an overview of aspects of the invention, embodiments of the invention address the above-described shortcomings by providing computing systems, computer-implemented methods, and computer program products operable to automatically generate a normalized electronic audit report by converting the audit information of the electronic audit report from the multiple electronic format types to a normalized electronic format. In embodiments of the invention, the electronic audit report covers a first time range of activity, and is one of multiple electronic audit reports covering multiple time ranges of activity. In embodiments of the invention, converting the electronic audit report to the normalized electronic format includes extracting information from unstructured service and organizational control audit reports using natural language processing and computer vision. Embodiments of the invention systematically extract information using two separate extraction pipelines. In one of the pipelines, machine learning models (e.g., a heuristic model) is used to extract data of interest from text portions of unstructured or semi-structured SOC audit reports (e.g., in a PDF format), annotate the extracted information with text labels in the form of metadata, then warehouse the labeled extracted information in a searchable repository or database. In the other pipeline, a computer-vision algorithm is used to extract data of interest from the unstructured or semi-structured SOC report that do not fall into a conventional natural language text format, examples of which include natural language information presented in tables, graphs, charts, diagrams, and the like. In embodiments of the invention, the non-natural language text format portions of the SOC report are identified, and the computer vision algorithm is trained to extract document data by converting the convert PDF documents to hypertext markup language (HTML) formats that preserve the original structure of the information, then using known techniques for scraping data from HTML files for extracting target information from the HTML files. A second machine learning algorithm (e.g., a second heuristic model) is used to annotate the extracted information with text labels in the form of metadata, thereby forming the normalized electronic format. The labeled extracted information is warehoused in a searchable repository or database. The repository now contains a complete set of labeled extracted data from the two pipelines can be provided to downstream system for automation, analysis and alerts related to the warehoused data.

Thus, embodiments of the invention provide a computer systems, computer-implemented methods, and computer program products for the automatic ingestion and breakdown of electronic SOC audit reports for information extraction using natural language processing and computer vision to enable summarized reporting of coverage, maturity, with scoring risk capabilities. Coverage determination can be used to identify red flags, security issues and risks when looking at and analyzing SOC reports. Embodiments of the invention increase efficiency, transparency, and provide a greater level of organizational information recall. Embodiments of the invention enable the creation of a searchable database, which will over time enhance enterprise risk assessments capabilities of 3rd party vendors. Creation of such a database will allow company specific information retrieval and pattern recognition pertaining audit behavior over multiple different time ranges.

Turning now to a more detailed description of the aspects of the present invention, FIG. 1 depicts a simplified block diagram illustrating a system 100 in accordance with embodiments of the invention. The system 100 includes a data ingestion module 110; a Pipeline-1 supported b a heuristic model 112; a Pipeline-2 supported by computer-vision extraction model 114 and a heuristic extraction model 116; a concatenation module 118, and an output module 120 configured and arranged as shown. The output generated by the output module 120 is provided to a searchable repository 130, which, in some embodiments of the invention, can be part of the system 100. The inputs to the system 100 are electronic documents 102, which in aspects of the invention are electronic versions (e.g., PDF versions) of SOC audit reports.

A cloud computing system 50 is in wired or wireless electronic communication with the system 100. The cloud computing system 50 can supplement, support or replace some or all of the functionality of the various components of the system 100. Additionally, some or all of the functionality of the system 100 can be implemented as a node of the cloud computing system 50. Additional details of cloud computing features of embodiments of the invention are depicted by the computing environment 800 shown in FIG. 8 and described in greater detail subsequently herein.

The various components/modules/models of the system 100 shown in FIGS. 1-5 are depicted separately or combined for ease of illustration and explanation. In embodiments of the invention, the functions performed by the various components/modules/models of the system 100 can be distributed differently than shown in FIGS. 1-5 without departing from the scope of the various embodiments of the invention describe herein unless it is specifically stated otherwise.

The ingestion module 110 can, in some embodiments of the invention, implement data aggregation with encrypted access for computer-based information as part of a data protection scheme. An implemented storage strategy will allow secure remote access, data integrity, and enhanced privacy safeguards. The ingestion module 110 can work with the cloud computing system 50 to implement encrypted cloud-based storage with single point of access via explicit user id handle and storage key to ensure all mentioned safeguards are in place. Further, access key to audit documents can be shared with a machine learning hub, allowing centralized access to all stored documents at a single point of contact vs. single file-instance. At this stage storage access via hub allows parallel processing for both pipelines.

From the ingestion module 110, the data moves along two independent pipelines, which are shown as Pipeline-1 and Pipeleine-2 in FIG. 1, for extracting information. Pipeline-1 uses a heuristic model 112 to perform a heuristic model information extraction. A heuristic model is basically a rule-based algorithm that parses text from a document.

Pipeline-2 works on the same document and applies a computer vision (CV) algorithm in the form of CV extraction model 114. The CV model 114 extracts "tables" from the document and converts the table to an HTML file that preserves the structure of the table. The HM extraction model 116 is used to extract information from the HTML file. Pipleline-1 and Pipeline-2 are aggregated at the concatenation module 118 then output from the output module 120 to the searchable repository 130. Additional details of how Pipeline-1 and Pipeline-2 can be implemented in accordance with embodiments of the invention are depicted in FIGS. 2 and 3 and described in greater detail below.

Figure 2:
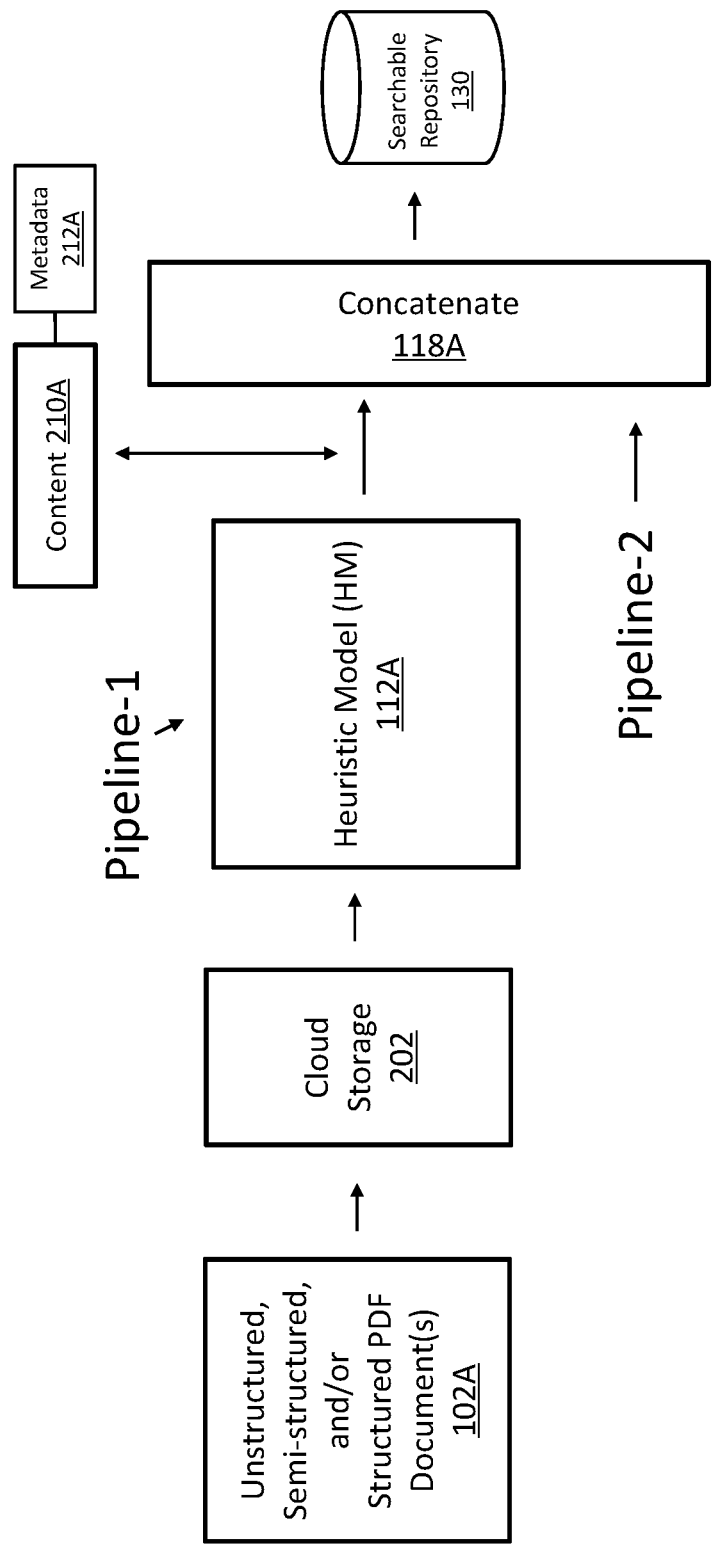
FIG. 2 depicts a simplified block diagram illustrating a system in accordance with embodiments of the invention.

Referring now to FIG. 2, additional details of how Pipeline-1 can be implemented are shown. In the example depicted in FIG. 2, unstructured, semi-structured, and/or structured PDF 102A are uploaded in bulk to a cloud storage 202, which can be implemented by the cloud computing system 50 (shown in FIG. 1). The cloud storage 202 then presents each PDF document one-by-one to the heuristic model 112A (or Pipeline-1). The heuristic model 112A is operable to convert the PDF document 102A from a PDF format to raw text. This conversion is possible via open-source library Apache Tika®. Use of this library via python programming language allows document breakdown of varying formatted text (PDF, XLS, PPT) into content 210A and metadata 212A. This level of information breakdown allows for both text indexing and content analysis. As such, the content of the PDF document 102A is then accessible by NLP techniques for further evaluation and information extraction.

Figure 3:
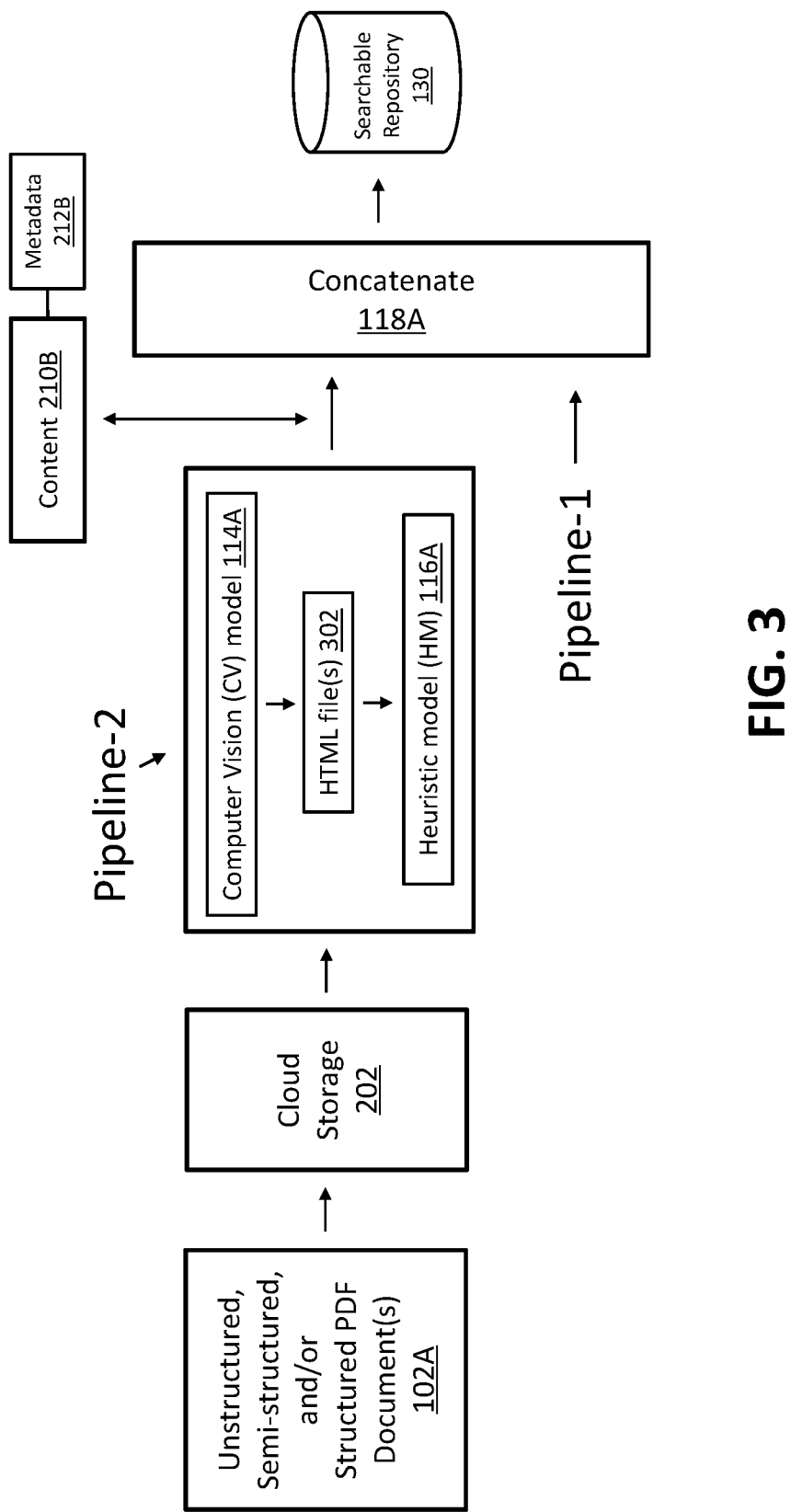
FIG. 3 depicts a flow diagram illustrating a computer-implemented method in accordance with embodiments of the invention.

Referring now to FIG. 3, additional details of how Pipeline-2 can be implemented are shown. In the example depicted in FIG. 3, the unstructured, semi-structured, and/or structured PDF 102A are uploaded in bulk to the cloud storage 202, which can be implemented by the cloud computing system 50 (shown in FIG. 1). The cloud storage 202 then presents each PDF document one-by-one to Pipeline-2, which is implemented as a CV model 114A and a heuristic model 116A. Pipleline-2 handles the portions of the PDF document 102A that do not fall into a conventional natural language text format, examples of which include natural language information presented in tables, graphs, charts, diagrams, and the like. For example, information specific to security controls, auditors test results of the specified controls, and managers response to the audit findings are presented in a table format in a designated section (V) within the report. Although the use of Apache Tika, will provide access to the presented text within the tables, in doing so information presented in the data files will lose its structural integrity. Once this formatting is lost, accessed information will be meaningless and difficult to comprehend as table structures are key to identify existence of noted exception within the text. Therefore, it is not feasible to use Pipeline-1 for information retrieval here.

Pipeline-2 uses a computer aided object detection (e.g., the CV model 114A) to convert the PDF format of the PDF document 102A files to the HTML file(s) 302. In doing so, data integrity will be preserved and presented tables will keep data in their original format. In some embodiments of the invention, the CV model 114A can be implemented as a pretrained model, an example of which is an existing package known as Corpus Conversion Service (CCS), which is a part of IBM's Deep Search Platform, which also facilitates data with IBM Watson Discovery. The premise of the CCS platform is a user interface for simple AI model development to extract unstructured information from complex data files such as PDF documents. Model output can be segmented in two potential file types, either JSON or HTML. Upon conversion, various document information such as title, paragraph, images, and tables will be exposed while maintaining data integrity. In accordance with aspects of the invention, the pretrained CCS model can be exclusively trained on two document types. The first type is scientific journals and patent submissions. The second type is training data specific to SOC audit reports. The model's ability to detect tables with a high degree of accuracy is instrumental in extracting document information in the second leg of Pipeline-2. Training the CCS model on SOC specific audit reports, enhances the model's capability to detect data structure within documents with such reporting structure and format.

Although, some variations do appear to be visible between SOC auditors, the data, however, is generally presented consistently among the SOC documents with section headings leading to document tables containing auditors' findings, test results, and managements response to the audit findings. Therefore, in Pipeline-2 an extension to Pipeline-1 will once more be used for information retrieval. As described, the document conversion performed by the CCS model allows file to be outputted as HTML files 302. Unlike, PDF files where data cannot be accessed directly, HTML files 302 are simple webpage documents, where information can be extracted using web scraping techniques. The Python standard library, "beautifulsoup" provides access to document via iteration and parse tree modification. For example, information related to audit reports within table formats, can now be accessed via HTML tags (not shown separately from the HTML files 302). Therefore, target text within the document can be easily accessed and stored.

Figure 4:
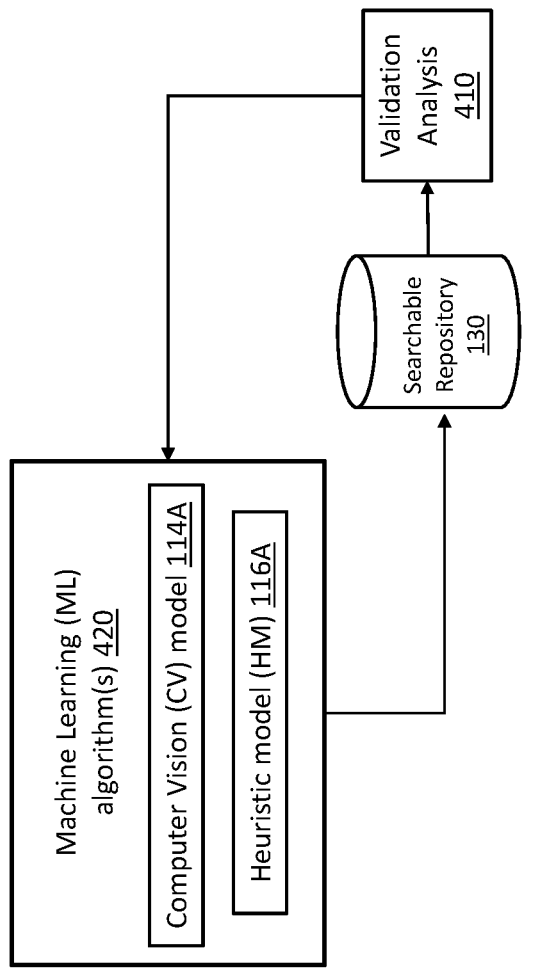
FIG. 4 depicts a simplified block diagram illustrating a validation and machine learning algorithm updating and training system in accordance with embodiments of the invention.

FIG. 4, depicts an example of how a validation analysis 410 can be applied to machine learning algorithms 420 used in accordance with aspects of the invention. As shown in FIG. 4, the machine learning algorithms 420 include the CV model 114A and the heuristic model 116A. Performing the validity analysis 410 ensures model accuracy and reliability on the extracted information. If model output is not validated prior to deployment, this could lead to invalid warehousing, and consequently misleading security experts when evaluating extracted results. To validate model accuracy, output from the algorithms described herein will be compared with a validation set of original SOC reports annotated by a security architect/expert. The annotated document SOC reports are stored in an excel spreadsheet, which will undergo iterations for parallel string comparison.

Figure 5:
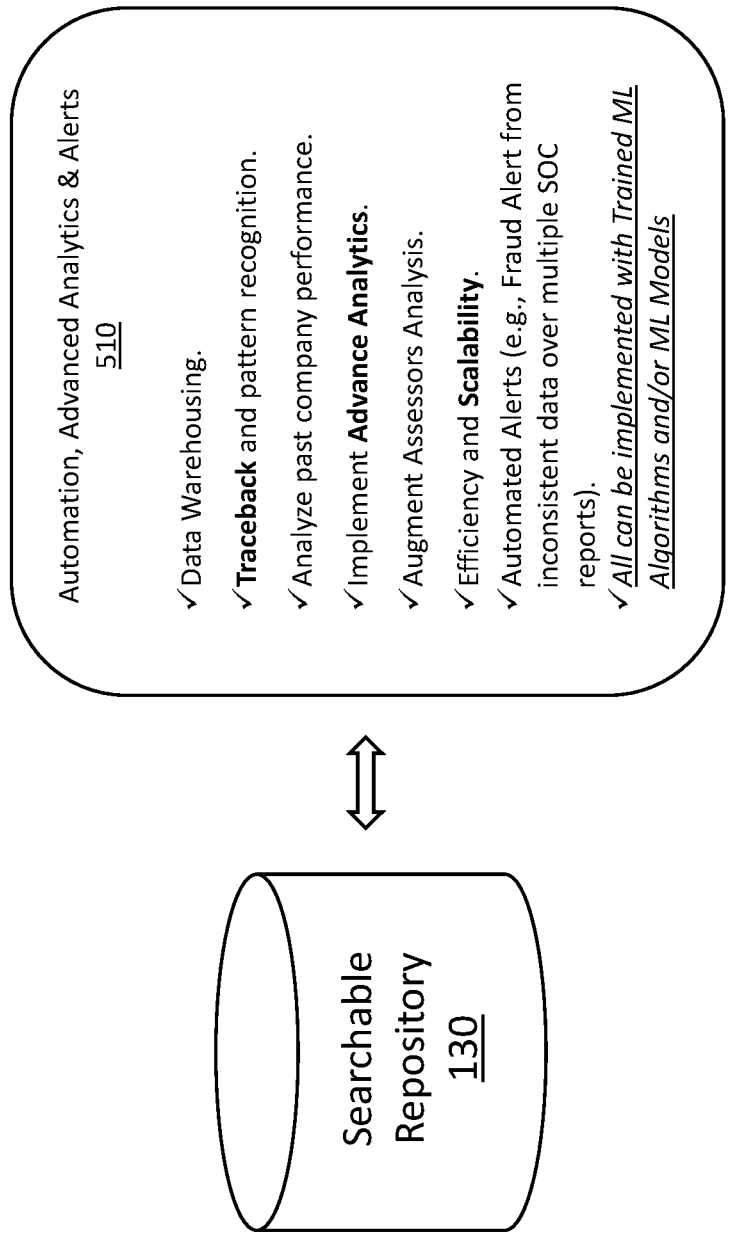
FIG. 5 depicts aa simplified block diagram illustrating how an advanced analytics and alerts system can be implemented in accordance with embodiments of the invention.

FIG. 5 depicts an example of how the information stored at the repository 130 can be used downstream in automation, analytics and alerts systems 510. Non-liming example of such down stream systems 510 include, but are not limited to, data warehousing; traceback and pattern recognition; analysis of past company performance; implement advanced analytics; augment assessor analysis; efficiency and scalability; and automated alerts (e.g., Fraud Alert from inconsistent data over multiple SOC reports). Any or all features of the system 510 can be implemented using trained ML algorithms and/or ML Models.

Figure 6:
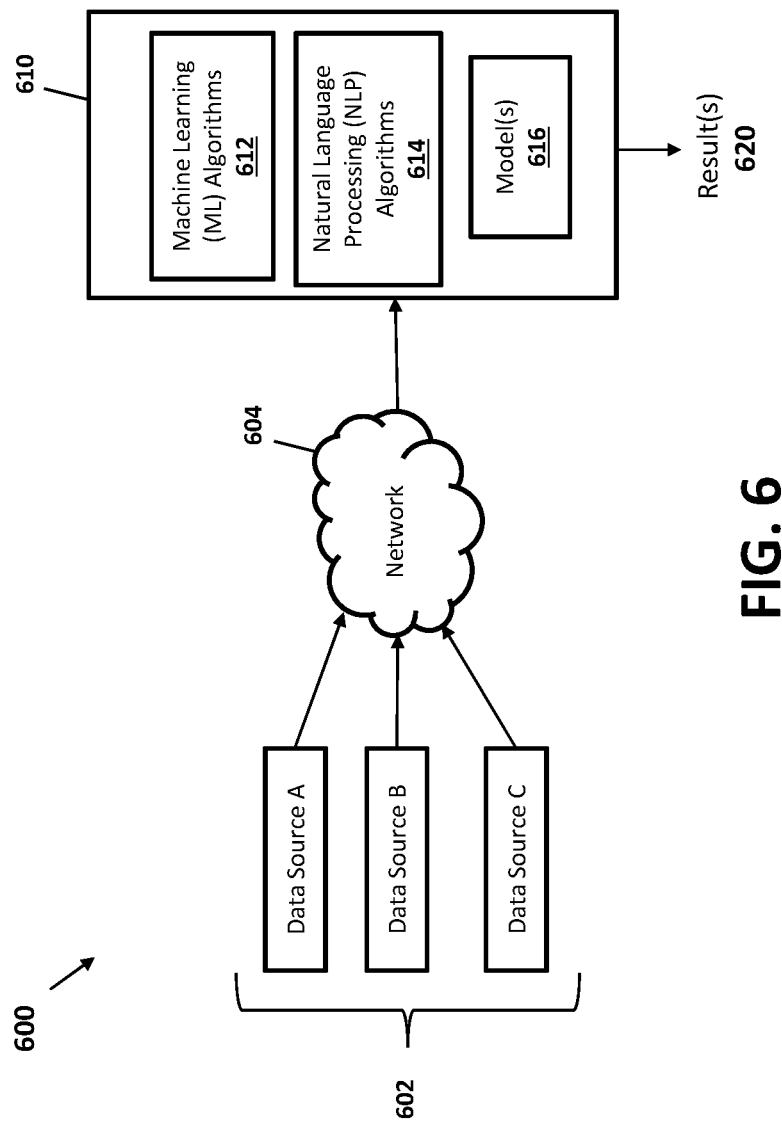
FIG. 6 depicts a machine learning system that can be utilized to implement aspects of the invention.
Figure 7:
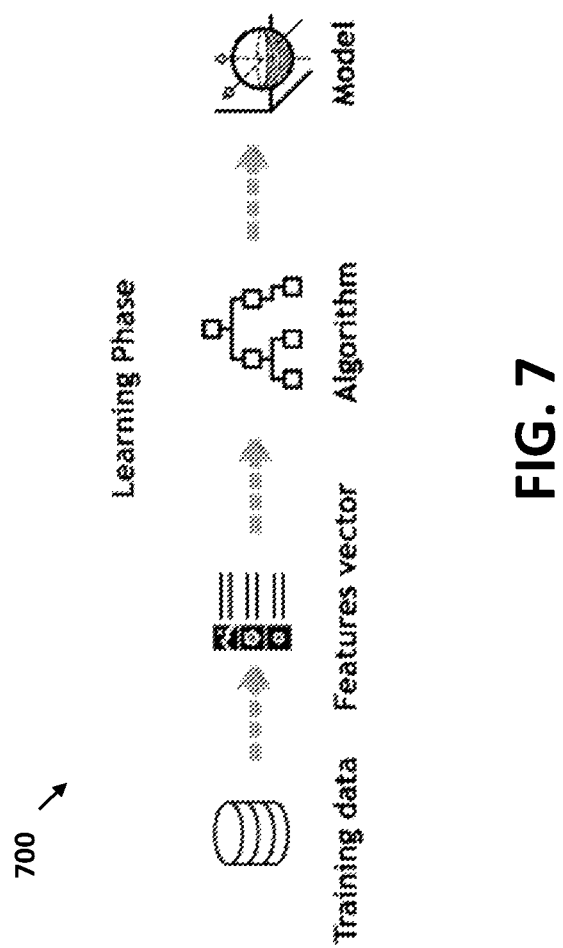
FIG. 7 depicts a learning phase that can be implemented by the machine learning system shown in FIG. 6.

Additional options for implementing the various ML algorithms and model used in connection with embodiments of the invention are depicted in FIGS. 6 and 7. Machine learning models configured and arranged according to embodiments of the invention will be described with reference to FIG. 6. Detailed descriptions of an example computing environment 800 and network architecture capable of implementing embodiments of the invention described herein will be provided with reference to FIG. 8.

FIG. 6 depicts a block diagram showing a classifier system 600 capable of implementing various aspects of the invention described herein. More specifically, the functionality of the system 600 is used in embodiments of the invention to generate various models and/or sub-models that can be used to implement computer functionality in embodiments of the invention. The system 600 includes multiple data sources 602 in communication through a network 604 with a classifier 610. In some aspects of the invention, the data sources 602 can bypass the network 604 and feed directly into the classifier 610. The data sources 602 provide data/information inputs that will be evaluated by the classifier 610 in accordance with embodiments of the invention. The data sources 602 also provide data/information inputs that can be used by the classifier 610 to train and/or update model(s) 616 created by the classifier 610. The data sources 602 can be implemented as a wide variety of data sources, including but not limited to, sensors configured to gather real time data, data repositories (including training data repositories), and outputs from other classifiers. The network 604 can be any type of communications network, including but not limited to local networks, wide area networks, private networks, the Internet, and the like.

Figure 8:
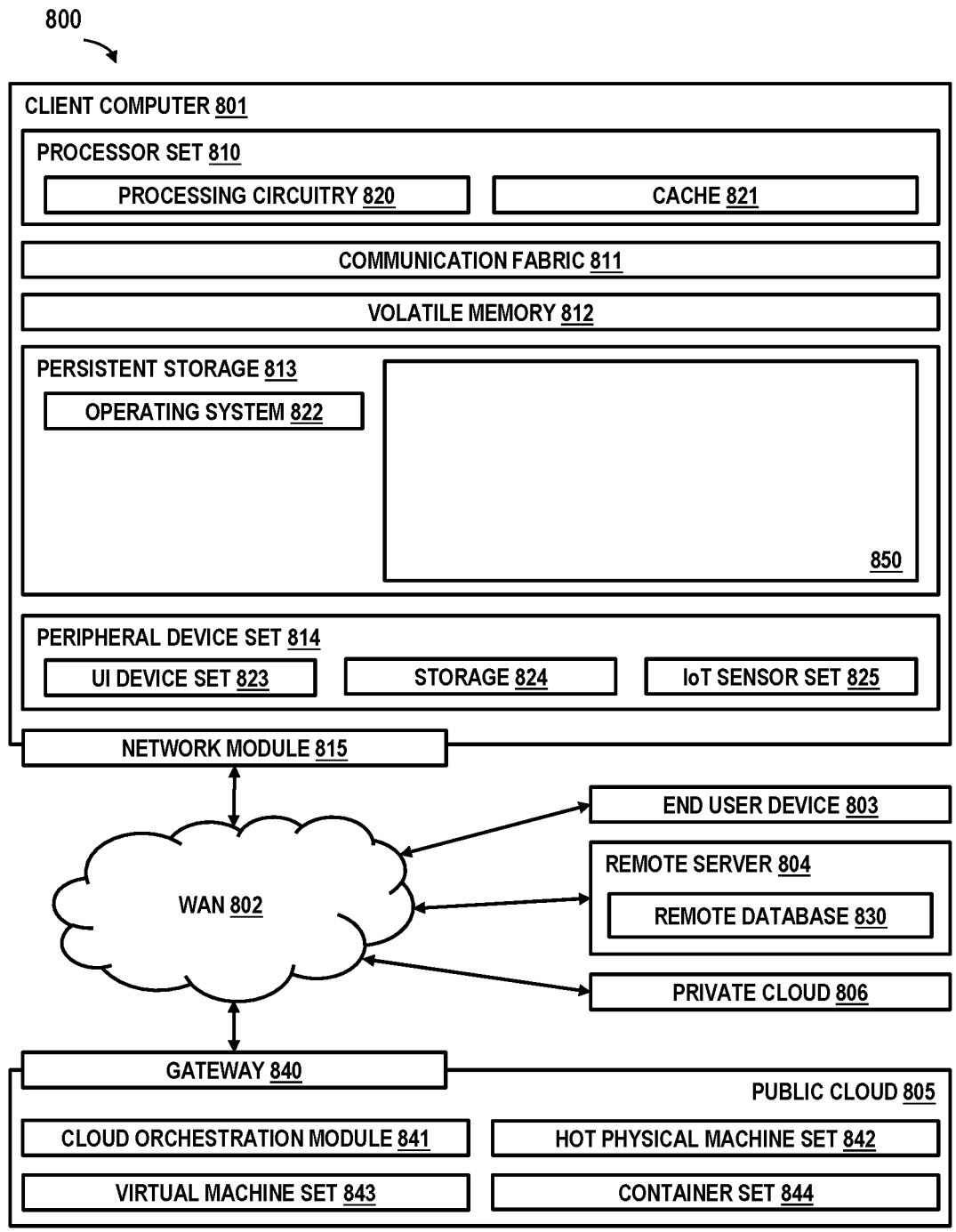
FIG. 8 depicts details of an exemplary computing environment operable to implement embodiments of the invention.

The classifier 610 can be implemented as algorithms executed by a programmable computer such as the computing environment 800 (shown in FIG. 8). As shown in FIG. 6, the classifier 610 includes a suite of machine learning (ML) algorithms 612; natural language processing (NLP) algorithms 614; and model(s) 616 that are relationship (or prediction) algorithms generated (or learned) by the ML algorithms 612. The algorithms 612, 614, 616 of the classifier 610 are depicted separately for ease of illustration and explanation. In embodiments of the invention, the functions performed by the various algorithms 612, 614, 616 of the classifier 610 can be distributed differently than shown. For example, where the classifier 610 is configured to perform an overall task having sub-tasks, the suite of ML algorithms 612 can be segmented such that a portion of the ML algorithms 612 executes each sub-task and a portion of the ML algorithms 612 executes the overall task. Additionally, in some embodiments of the invention, the NLP algorithms 614 can be integrated within the ML algorithms 612.

The NLP algorithms 614 includes text recognition functionality that allows the classifier 610, and more specifically the ML algorithms 612, to receive natural language data (e.g., text written as English alphabet symbols) and apply elements of language processing, information retrieval, and machine learning to derive meaning from the natural language inputs and potentially take action based on the derived meaning. The NLP algorithms 614 used in accordance with aspects of the invention can also include speech synthesis functionality that allows the classifier 610 to translate the result(s) 620 into natural language (text and audio) to communicate aspects of the result(s) 620 as natural language communications.

The NLP and ML algorithms 614, 612 receive and evaluate input data (i.e., training data and data-under-analysis) from the data sources 602. The ML algorithms 612 include functionality that is necessary to interpret and utilize the input data's format. For example, where the data sources 602 include image data, the ML algorithms 612 can include visual recognition software configured to interpret image data. The ML algorithms 612 apply machine learning techniques to received training data (e.g., data received from one or more of the data sources 602) in order to, over time, create/train/update one or more models 616 that model the overall task and the sub-tasks that the classifier 610 is designed to complete.

Referring now to FIGS. 6 and 7 collectively, FIG. 7 depicts an example of a learning phase 700 performed by the ML algorithms 612 to generate the above-described models 616. In the learning phase 700, the classifier 610 extracts features from the training data and converts the features to vector representations that can be recognized and analyzed by the ML algorithms 612. The feature vectors are analyzed by the ML algorithm 612 to "classify" the training data against the target model (or the model's task) and uncover relationships between and among the classified training data. Examples of suitable implementations of the ML algorithms 612 include but are not limited to neural networks, support vector machines (SVMs), logistic regression, decision trees, hidden Markov Models (HMMs), etc. The learning or training performed by the ML algorithms 612 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 610 and the ML algorithms 612. Unsupervised learning can utilize additional learning/training methods including, for example, clustering, anomaly detection, neural networks, deep learning, and the like.

When the models 616 are sufficiently trained by the ML algorithms 612, the data sources 602 that generate "real world" data are accessed, and the "real world" data is applied to the models 616 to generate usable versions of the results 620. In some embodiments of the invention, the results 620 can be fed back to the classifier 610 and used by the ML algorithms 612 as additional training data for updating and/or refining the models 616.

In aspects of the invention, the ML algorithms 612 and the models 616 can be configured to apply confidence levels (CLs) to various ones of their results/determinations (including the results 620) in order to improve the overall accuracy of the particular result/determination. When the ML algorithms 612 and/or the models 616 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 610 can be configured to apply confidence levels (CLs) to the results 620. When the classifier 610 determines that a CL in the results 620 is below a predetermined threshold (TH) (i.e., CL<TH), the results 620 can be classified as sufficiently low to justify a classification of "no confidence" in the results 620. If CL>TH, the results 620 can be classified as sufficiently high to justify a determination that the results 620 are valid. Many different predetermined TH levels can be provided such that the results 620 with CL>TH can be ranked from the highest CL>TH to the lowest CL>TH.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 8 depicts an example computing environment 800 that can be used to implement aspects of the invention. Computing environment 800 contains an example of an environment for the execution of at least some of the computer code involved in performing the inventive methods, such as computer-implemented methods and computer program products 850 automatically extract information from unstructured service and organizational control (SOC) audit reports using natural language processing and computer vision. In addition to block 850, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 850, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 850 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 850 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   using a processor system, to access a plurality of electronic audit reports, wherein each of the plurality of electronic audit reports comprises audit information of operations of an entity-under-evaluation (EUA) covering a first time-range;
   wherein the audit information comprises multiple electronic format types comprising a first electronic format type and a second electronic format type;
   using the processor system to apply multiple iterations of a multi-pipeline extraction and generation process configured to output a plurality of labeled audit information sets in a normalized electronic format comprising extracted content and generated labels;
   wherein each of the multiple iterations of the multi-pipeline extraction and generation process comprises:
      accessing an electronic audit report from among the plurality of electronic audit reports:
      passing the electronic audit report, in parallel, through a first data extraction and generation pipeline and a second data extraction and generation pipeline, wherein the first data extraction and generation pipeline is separate from the second data extraction and generation pipeline;
      wherein the first data extraction and generation pipeline is configured to extract and generate a first labeled information set from audit information in the first electronic format type;
      wherein the second data extraction and generation pipeline is configured to extract and generate a second labeled information set from audit information in the second electronic format type; and
      generating a concatenation of the first labeled information set with the second labeled information set to form a single record for the electronic audit report; and
      incorporating the concatenation into the plurality of labeled audit information sets in the normalized electronic format comprising extracted content and generated labels; and
   storing the plurality of labeled audit information sets in a searchable repository.

2. The computer-implemented method of claim 1, wherein:
the searchable repository comprises a plurality of the normalized electronic audit reports of the EUA covering a plurality of time-ranges that are prior to the first time-range; and
the computer-implemented method further comprises using an instance of the plurality of labeled audit information sets in the normalized electronic format to search the searchable repository to determine how stored audit information associated with the EUA and the instance of the plurality of labeled audit information sets in the normalized electronic format have changed over the plurality of time-ranges and the first time-range.

3. The computer-implemented method of claim 1, wherein:
the first data extraction and generation pipeline comprises a first heuristic model; and
the first heuristic model is trained to:
generate first extracted audit information from the audit information in first electronic format type; and
generate a first annotation of the first extracted audit information.

4. The computer-implemented method of claim 3, wherein:
the second data extraction and generation pipeline comprises a computer vision (CV) model and a second heuristic model;
the CV model is trained to:
recognize in the electronic audit report the audit information in the second electronic format type; and
convert the audit information in the second electronic format type to a hypertext markup language (HTML) file configured to preserve the audit information and a structure of the second electronic format type; and
the second heuristic model is trained to:
generate second extracted audit information from the audit information in the HTML file; and
generate a second annotation of the second extracted audit information and of the structure of the second electronic format type.

5. The computer-implemented method of claim 4, wherein:
the first electronic format type comprises a natural language (NL) text format; and
the second electronic format type comprises a non-NL text format.

6. The computer-implemented method of claim 5, wherein the electronic audit report comprises a portable document format (PDF) comprising the multiple electronic format types.

7. The computer-implemented method of claim 5, wherein the non-NL text format comprises a table.

8. A computer system comprising a processor system and a memory electronically coupled to the processor system, wherein the processor system is configured to perform processor system operations comprising:
accessing a plurality of electronic audit reports, wherein each of the plurality of electronic audit information reports comprises audit information of operations of an entity-under-evaluation (EUA) covering a first time-range;
wherein the audit information comprises multiple electronic format types comprising a first electronic format type and a second electronic format type;
apply multiple iterations of a multi-pipeline extraction and generation process configured to output a plurality of labeled audit information sets in a normalized electronic format comprising extracted content and generated labels;
wherein each of the multiple iterations of the multi-pipeline extraction and generation process comprises:
accessing an electronic audit report from among the plurality of electronic audit reports:
passing the electronic audit report, in parallel, through a first data extraction and generation pipeline and a second data extraction and generation pipeline, wherein the first data extraction and generation pipeline is separate from the second data extraction and generation pipeline;
wherein the first data extraction and generation pipeline is configured to extract and generate a first labeled information set from audit information in the first electronic format type;
wherein the second data extraction and generation pipeline is configured to extract and generate a second labeled information set from audit information in the second electronic format type; and
generating a concatenation of the first labeled information set with the second labeled information set to form a single record for the electronic audit report; and
incorporating the concatenation into the plurality of labeled audit information sets in the normalized electronic format comprising extracted content and generated labels; and
storing the plurality of labeled audit information sets in a searchable repository.

9. The computer system of claim 8, wherein:
the searchable repository comprises a plurality of the normalized electronic audit reports of the EUA covering a plurality of time-ranges that are prior to the first time-range; and
the processor system operations further comprise using an instance of the plurality of labeled audit information sets in the normalized electronic format to search the searchable repository to determine how stored audit information associated with the EUA and the instance of the plurality of labeled audit information sets in the normalized electronic format have changed over the plurality of time-ranges and the first time-range.

10. The computer system of claim 8, wherein:
the first data extraction and generation pipeline comprises a first heuristic model; and
the first heuristic model is trained to:
generate first extracted audit information from the audit information in first electronic format type; and
generate a first annotation of the first extracted audit information.

11. The computer system of claim 10, wherein:
the second data extraction and generation pipeline comprises a computer vision (CV) model and a second heuristic model;
the CV model is trained to:
recognize in the electronic audit report the audit information in the second electronic format type; and
convert the audit information in the second electronic format type to a hypertext markup language (HTML) file configured to preserve the audit information and a structure of the second electronic format type; and the second heuristic model is trained to:
  generate second extracted audit information from audit information in the HTML file; and
  generate a second annotation of the second extracted audit information and of the structure of the second electronic format type.

12. The computer system of claim 11, wherein:
the first electronic format type comprises a natural language (NL) text format; and
the second electronic format type comprises a non-NL text format.

13. The computer system of claim 12, wherein the electronic audit report comprises a portable document format (PDF) comprising the multiple electronic format types.

14. The computer system of claim 12, wherein the non-NL text format comprises a table.

15. A computer program product comprising a computer readable program stored on a computer readable storage medium, wherein the computer readable program, when executed on a processor system, causes the processor system to perform processor system operations comprising:
  accessing a plurality of electronic audit reports, wherein each of the plurality of electronic audit information reports comprises audit information of operations of an entity-under-evaluation (EUA) covering a first time-range;
  wherein the audit information comprises multiple electronic format types comprising a first electronic format type and a second electronic format type;
  apply multiple iterations of a multi-pipeline extraction and generation process configured to output a plurality of labeled audit information sets in a normalized electronic format comprising extracted content and generated labels;
  wherein each of the multiple iterations of the multi-pipeline extraction and generation process comprises:
  accessing an electronic audit report from among the plurality of electronic audit reports:
    passing the electronic audit report, in parallel, through a first data extraction and generation pipeline and a second data extraction and generation pipeline, wherein the first data extraction and generation pipeline is separate from the second data extraction and generation pipeline;
    wherein the first data extraction and generation pipeline is configured to extract and generate a first labeled information set from audit information in the first electronic format type;
    wherein the second data extraction and generation pipeline is configured to extract and generate a second labeled information set from audit information in the second electronic format type; and
  generating a concatenation of the first labeled information set with the second labeled information set to form a single record for the electronic audit report; and
  incorporating the concatenation into the plurality of labeled audit information sets in the normalized electronic format comprising extracted content and generated labels; and
  storing the plurality of labeled audit information sets in a searchable repository.

16. The computer program product of claim 15, wherein:
the searchable repository comprises a plurality of the normalized electronic audit reports of the EUA covering a plurality of time-ranges that are prior to the first time-range; and
the processor system operations further comprise using an instance of the plurality of labeled audit information sets in the normalized electronic format to search the searchable repository to determine how stored audit information associated with the EUA and the instance of the plurality of labeled audit information sets in the normalized electronic format hashave changed over the plurality of time-ranges and the first time-range.

17. The computer program product of claim 15, wherein:
the first data extraction and generation pipeline comprises a first heuristic model; and
the first heuristic model is trained to:
  generate first extracted audit information from the audit information in first electronic format type; and
  generate a first annotation of the first extracted audit information.

18. The computer program product of claim 17, wherein:
the second data extraction and generation pipeline comprises a computer vision (CV) model and a second heuristic model;
the CV model is trained to:
  recognize in the electronic audit report the audit information in the second electronic format type; and
  convert the audit information in the second electronic format type to a hypertext markup language (HTML) file configured to preserve the audit information and a structure of the second electronic format type; and
the second heuristic model is trained to:
  generate second extracted audit information from audit information in the HTML file; and
  generate a second annotation of the second extracted audit information and of the structure of the second electronic format type.

19. The computer program product of claim 18, wherein:
the first electronic format type comprises a natural language (NL) text format; and
the second electronic format type comprises a non-NL text format.

20. The computer program product of claim 19, wherein:
the electronic audit report comprises a portable document format (PDF) comprising the multiple electronic format types; and
the non-NL text format comprises a table.

* * * * *